US008922827B2

(12) United States Patent
Nishizaki (10) Patent No.: US 8,922,827 B2
(45) Date of Patent: Dec. 30, 2014

(54) IMAGE PROCESSING APPARATUS

(75) Inventor: Takashi Nishizaki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 440 days.

(21) Appl. No.: 13/181,012

(22) Filed: Jul. 12, 2011

(65) Prior Publication Data

US 2012/0019846 A1  Jan. 26, 2012

(30) Foreign Application Priority Data

Jul. 23, 2010  (JP) ................................. 2010-166163

(51) Int. Cl.
  *G06K 15/00*  (2006.01)
  *H04N 1/405*  (2006.01)
(52) U.S. Cl.
  CPC .................................... *H04N 1/405* (2013.01)
  USPC .............................. 358/1.9; 358/2.1; 358/3.1
(58) Field of Classification Search
  USPC ......................... 358/1.8, 3.06, 3.13, 3.16, 3.3
  See application file for complete search history.

(56) References Cited

U.S. PATENT DOCUMENTS

| 6,052,113 A | 4/2000 | Foster | |
|---|---|---|---|
| 2003/0081258 A1* | 5/2003 | Sugizaki | 358/3.14 |
| 2009/0109509 A1* | 4/2009 | Yabe | 358/536 |

FOREIGN PATENT DOCUMENTS

| EP | 0 665 673 A2 | 8/1995 | |
|---|---|---|---|
| EP | 1 143 703 A1 | 10/2001 | |
| EP | 1 307 041 A2 | 5/2003 | |
| JP | 8-85232 | 4/1996 | |
| JP | 9-163127 | 6/1997 | |
| JP | 2000-004358 A | 1/2000 | |
| JP | 2000-004358 | * 7/2000 | ............. H04N 1/405 |
| JP | 2003-116000 | 4/2003 | |
| JP | 2007-281815 | 10/2007 | |

OTHER PUBLICATIONS

Japanese Official Action dated Feb. 4, 2014 received from related Japanese application No. 2010-166163.
Lippel B. et al., "The Effect of Dither on Luminance Quantization of Pictures", *IEEE Transactions on Communication Technology* Vol. COM-19(6):879-888 (Dec. 1, 1971).
Extended Search Report dated Oct. 24, 2011 received from the European Patent Office from related European Application No. 11173853. 0.

* cited by examiner

*Primary Examiner* — Jerome Grant, II
(74) *Attorney, Agent, or Firm* — Scully, Scott, Murphy & Presser, P.C.

(57) ABSTRACT

An image processing apparatus includes a storage unit and a converting unit. The storage unit stores a dither matrix including a plurality of sub-matrices. Each sub-matrix has a group of dot regions and each dot region has a threshold value. The dot regions are arranged in N rows and N columns in which N is an integer greater than or equal to 4 and the dot regions define a first diagonal line and a second diagonal line. Each sub-matrix has a plurality of first orthogonal lines extending in a direction parallel to the first diagonal line and a plurality of second orthogonal lines extending in a direction parallel to the second diagonal line. N dot regions whose threshold value is smaller than a prescribed value are contained in the group of dot regions. Only one of N dot regions is contained in each row and each column. At most one of N dot regions is contained in each first orthogonal line and each second orthogonal line. The converting unit is configured to convert print data into binary data by using the dither matrix.

6 Claims, 10 Drawing Sheets

| 48 | 0  | 32 | 52 | 51 | 3  | 35 | 55 |
|----|----|----|----|----|----|----|----|
| 40 | 16 | 20 | 12 | 43 | 19 | 23 | 15 |
| 8  | 24 | 28 | 44 | 11 | 27 | 31 | 47 |
| 56 | 36 | 4  | 60 | 59 | 39 | 7  | 63 |
| 50 | 2  | 34 | 54 | 49 | 1  | 33 | 53 |
| 42 | 18 | 22 | 14 | 41 | 17 | 21 | 13 |
| 10 | 26 | 30 | 46 | 9  | 25 | 29 | 45 |
| 58 | 38 | 6  | 62 | 57 | 37 | 5  | 61 |

FIG.4B 301

| 0  | 56 | 44 | 28 | 3  | 59 | 47 | 31 |
|----|----|----|----|----|----|----|----|
| 32 | 16 | 4  | 60 | 35 | 19 | 7  | 63 |
| 8  | 48 | 36 | 20 | 11 | 51 | 39 | 23 |
| 40 | 24 | 12 | 52 | 43 | 27 | 15 | 55 |
| 2  | 58 | 46 | 30 | 1  | 57 | 45 | 29 |
| 34 | 18 | 6  | 62 | 33 | 17 | 5  | 61 |
| 10 | 50 | 38 | 22 | 9  | 49 | 37 | 21 |
| 42 | 26 | 14 | 54 | 41 | 25 | 13 | 53 |

FIG.4C 302

| 0  | 48 | 12 | 60 | 3  | 51 | 15 | 63 |
|----|----|----|----|----|----|----|----|
| 32 | 16 | 44 | 28 | 35 | 19 | 47 | 31 |
| 8  | 56 | 4  | 52 | 11 | 59 | 7  | 55 |
| 40 | 24 | 36 | 20 | 43 | 27 | 39 | 23 |
| 2  | 50 | 14 | 62 | 1  | 49 | 13 | 61 |
| 34 | 18 | 46 | 30 | 33 | 17 | 45 | 29 |
| 10 | 58 | 6  | 54 | 9  | 57 | 5  | 53 |
| 42 | 26 | 38 | 22 | 41 | 25 | 37 | 21 |

FIG.4D 303

| 0  | 56 | 36 | 28 | 3  | 59 | 39 | 31 |
|----|----|----|----|----|----|----|----|
| 16 | 8  | 52 | 44 | 19 | 11 | 55 | 47 |
| 32 | 24 | 4  | 60 | 35 | 27 | 7  | 63 |
| 48 | 40 | 20 | 12 | 51 | 43 | 23 | 15 |
| 2  | 58 | 38 | 30 | 1  | 57 | 37 | 29 |
| 18 | 10 | 54 | 46 | 17 | 9  | 53 | 45 |
| 34 | 26 | 6  | 62 | 33 | 25 | 5  | 61 |
| 50 | 42 | 22 | 14 | 49 | 41 | 21 | 13 |

FIG.5A  221

| 48 | 0  | 32 | 52 | 51 | 3  | 35 | 55 |
|----|----|----|----|----|----|----|----|
| 40 | 16 | 20 | 12 | 43 | 19 | 23 | 15 |
| 8  | 24 | 28 | 44 | 11 | 27 | 31 | 47 |
| 56 | 36 | 4  | 60 | 59 | 39 | 7  | 63 |
| 50 | 2  | 34 | 54 | 49 | 1  | 33 | 53 |
| 42 | 18 | 22 | 14 | 41 | 17 | 21 | 13 |
| 10 | 26 | 30 | 46 | 9  | 25 | 29 | 45 |
| 58 | 38 | 6  | 62 | 57 | 37 | 5  | 61 |

FIG.5B  301

| 0  | 56 | 44 | 28 | 3  | 59 | 47 | 31 |
|----|----|----|----|----|----|----|----|
| 32 | 16 | 4  | 60 | 35 | 19 | 7  | 63 |
| 8  | 48 | 36 | 20 | 11 | 51 | 39 | 23 |
| 40 | 24 | 12 | 52 | 43 | 27 | 15 | 55 |
| 2  | 58 | 46 | 30 | 1  | 57 | 45 | 29 |
| 34 | 18 | 6  | 62 | 33 | 17 | 5  | 61 |
| 10 | 50 | 38 | 22 | 9  | 49 | 37 | 21 |
| 42 | 26 | 14 | 54 | 41 | 25 | 13 | 53 |

FIG.5C  302

| 0  | 48 | 12 | 60 | 3  | 51 | 15 | 63 |
|----|----|----|----|----|----|----|----|
| 32 | 16 | 44 | 28 | 35 | 19 | 47 | 31 |
| 8  | 56 | 4  | 52 | 11 | 59 | 7  | 55 |
| 40 | 24 | 36 | 20 | 43 | 27 | 39 | 23 |
| 2  | 50 | 14 | 62 | 1  | 49 | 13 | 61 |
| 34 | 18 | 46 | 30 | 33 | 17 | 45 | 29 |
| 10 | 58 | 6  | 54 | 9  | 57 | 5  | 53 |
| 42 | 26 | 38 | 22 | 41 | 25 | 37 | 21 |

FIG.5D  303

| 0  | 56 | 36 | 28 | 3  | 59 | 39 | 31 |
|----|----|----|----|----|----|----|----|
| 16 | 8  | 52 | 44 | 19 | 11 | 55 | 47 |
| 32 | 24 | 4  | 60 | 35 | 27 | 7  | 63 |
| 48 | 40 | 20 | 12 | 51 | 43 | 23 | 15 |
| 2  | 58 | 38 | 30 | 1  | 57 | 37 | 29 |
| 18 | 10 | 54 | 46 | 17 | 9  | 53 | 45 |
| 34 | 26 | 6  | 62 | 33 | 25 | 5  | 61 |
| 50 | 42 | 22 | 14 | 49 | 41 | 21 | 13 |

FIG.6A
221

| 48 | 0 | 32 | 52 | 51 | 3 | 35 | 55 |
|---|---|---|---|---|---|---|---|
| 40 | 16 | 20 | 12 | 43 | 19 | 23 | 15 |
| 8 | 24 | 28 | 44 | 11 | 27 | 31 | 47 |
| 56 | 36 | 4 | 60 | 59 | 39 | 7 | 63 |
| 50 | 2 | 34 | 54 | 49 | 1 | 33 | 53 |
| 42 | 18 | 22 | 14 | 41 | 17 | 21 | 13 |
| 10 | 26 | 30 | 46 | 9 | 25 | 29 | 45 |
| 58 | 38 | 6 | 62 | 57 | 37 | 5 | 61 |

FIG.6B
301

| 0 | 56 | 44 | 28 | 3 | 59 | 47 | 31 |
|---|---|---|---|---|---|---|---|
| 32 | 16 | 4 | 60 | 35 | 19 | 7 | 63 |
| 8 | 48 | 36 | 20 | 11 | 51 | 39 | 23 |
| 40 | 24 | 12 | 52 | 43 | 27 | 15 | 55 |
| 2 | 58 | 46 | 30 | 1 | 57 | 45 | 29 |
| 34 | 18 | 6 | 62 | 33 | 17 | 5 | 61 |
| 10 | 50 | 38 | 22 | 9 | 49 | 37 | 21 |
| 42 | 26 | 14 | 54 | 41 | 25 | 13 | 53 |

FIG.6C
302

| 0 | 48 | 12 | 60 | 3 | 51 | 15 | 63 |
|---|---|---|---|---|---|---|---|
| 32 | 16 | 44 | 28 | 35 | 19 | 47 | 31 |
| 8 | 56 | 4 | 52 | 11 | 59 | 7 | 55 |
| 40 | 24 | 36 | 20 | 43 | 27 | 39 | 23 |
| 2 | 50 | 14 | 62 | 1 | 49 | 13 | 61 |
| 34 | 18 | 46 | 30 | 33 | 17 | 45 | 29 |
| 10 | 58 | 6 | 54 | 9 | 57 | 5 | 53 |
| 42 | 26 | 38 | 22 | 41 | 25 | 37 | 21 |

FIG.6D
303

| 0 | 56 | 36 | 28 | 3 | 59 | 39 | 31 |
|---|---|---|---|---|---|---|---|
| 16 | 8 | 52 | 44 | 19 | 11 | 55 | 47 |
| 32 | 24 | 4 | 60 | 35 | 27 | 7 | 63 |
| 48 | 40 | 20 | 12 | 51 | 43 | 23 | 15 |
| 2 | 58 | 38 | 30 | 1 | 57 | 37 | 29 |
| 18 | 10 | 54 | 46 | 17 | 9 | 53 | 45 |
| 34 | 26 | 6 | 62 | 33 | 25 | 5 | 61 |
| 50 | 42 | 22 | 14 | 49 | 41 | 21 | 13 |

MISSING THIN LINE

FIG.7C

MISSING THIN LINE

WIDELY DIFFERENT PRINTING RESULTS FOR DIFFERENT ANGLES OF LINES

|  | DITHER MATRIX 221 | DITHER MATRIX 301 | DITHER MATRIX 302 | DITHER MATRIX 303 |
|---|---|---|---|---|
| LOWEST DENSITY CAPABLE OF APPEARING FINE LINE | 25% | 38% | 38% | 25% |
| LOWEST DENSITY HAVING TENDENCY TO COLLAPSE BLANK REGION | 81% | 50% | 44% | 63% |
| LOWEST DENSITY PRODUCING COLLAPSE OF BLANK REGION | 94% | 75% | 50% | 75% |

IMAGE PROCESSING APPARATUS

CROSS REFERENCE TO RELATED APPLICATION

This application claims priority from Japanese Patent Application No. 2010166163 filed Jul. 23, 2010. The entire content of the priority application is incorporated herein by reference.

TECHNICAL FIELD

The present invention relates to an image processing apparatus.

BACKGROUND

A thresholding process well known in the art uses a dither matrix to convert an image expressed in multilevel values (256-level values, for example) into binary values. Since this thresholding process renders each multilevel tone as a binary value (i.e., specifying a dot or no dot), the percentage of dots rendered in regions of an image having low-level values decreases. Therefore, problems can occur when an image subjected to the thresholding process includes fine lines represented by low-level values, because these fine lines may disappear when converted to binary values in the thresholding process due to the positional relationship of the lines and the dither matrix.

Therefore, a dithering technique has been proposed for cases in which the image subjected to the thresholding process includes fine lines. This technique involves setting the screen angle different from the angle of the lines.

SUMMARY

However, when the image subjected to thresholding includes fine lines having a plurality of angles, simply setting the screen angle different from the angle of some fine lines does not mean that the screen angle will be different from the angles of all fine lines. Further, small text rendered in low-level values, for example, may become difficult to read because portions of the lines forming the text are omitted, and this problem cannot be resolved by selecting a different screen angle.

In view of the foregoing, it is an object of the present invention to provide an image processing apparatus capable of reproducing thin lines and text rendered in low-level values through a thresholding process without greatly worsening image quality.

In order to attain the above and other objects, the invention provides an image processing apparatus including a storage unit and a converting unit. The storage unit stores a dither matrix including a plurality of sub-matrices. Each sub matrix has a group of dot regions and each dot region has a threshold value. The dot regions are arranged in N rows and N columns in which N is an integer greater than or equal to 4 and the dot regions define a first diagonal line and a second diagonal line. Each sub-matrix has a plurality of first orthogonal lines extending in a direction parallel to the first diagonal line and a plurality of second orthogonal lines extending in a direction parallel to the second diagonal line. N dot regions whose threshold value is smaller than a prescribed value are contained in the group of dot regions. Only one of N dot regions is contained in each row and each column. At most one of N dot regions is contained in each first orthogonal line and each second orthogonal line. The converting unit is configured to convert print data into binary data by using the dither matrix.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
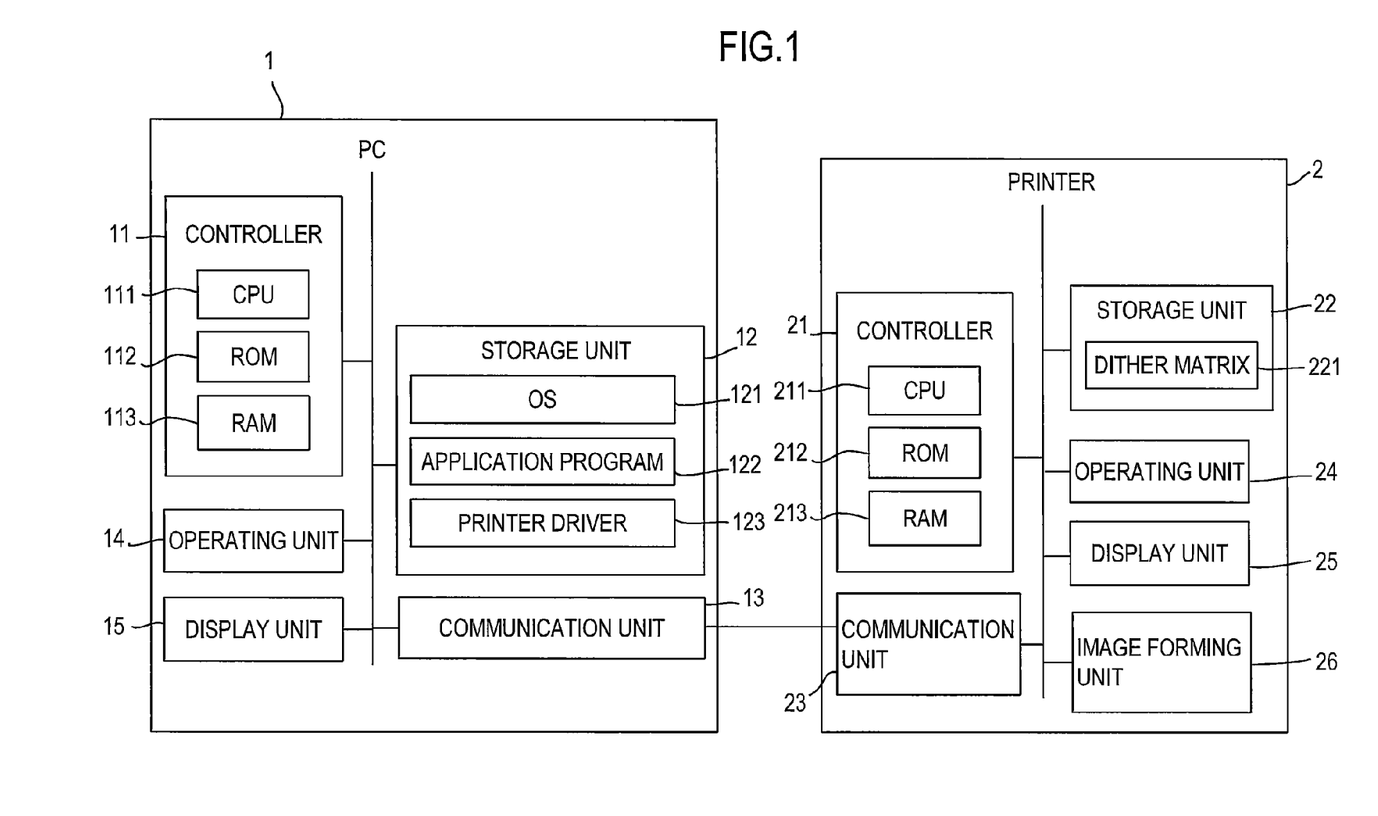
FIG. 1 is a block diagram showing an image processing system including an image processing apparatus according to an embodiment of the present invention.

FIG. 1 is a block diagram showing the general structure of a printing system including a personal computer (PC) 1, and a printer 2 that are capable of performing data communications with each other.

The PC 1 is a common data processor that includes a controller 11, a storage unit 12, a communication unit 13, an operating unit 14, and a display unit 15. The controller 11 performs overall control of each component in the PC 1. The controller 11 includes a CPU 111, a ROM 112, and a RAM 113.

The storage unit 12 is a nonvolatile storage device for storing data that can be overwritten. In this embodiment, a hard disk drive is employed as the storage unit 12. Various software programs are installed on the storage unit 12, including an operating system (OS) 121; application programs 122 for implementing graphical program and other applications (so-called software); and a printer driver 123 for enabling a user to use the printer 2 through the PC 1.

The communication unit 13 is an interface for performing data communications with the printer 2. The operating unit 14 is an input device that allows the user to input instructions through external operations. In this embodiment, a keyboard and a pointing device (a mouse, touchpad, or the like) are used as the operating unit 14. The display unit 15 is an output device for displaying various data in a visual form that the user can understand. In this embodiment, a liquid crystal display is used as the display unit 15.

The printer 2 is an electrographic-type image forming device including a controller 21, a storage unit 22, a communication unit 23, an operating unit 24, a display unit 25, and an image forming unit 26.

Figure 2:
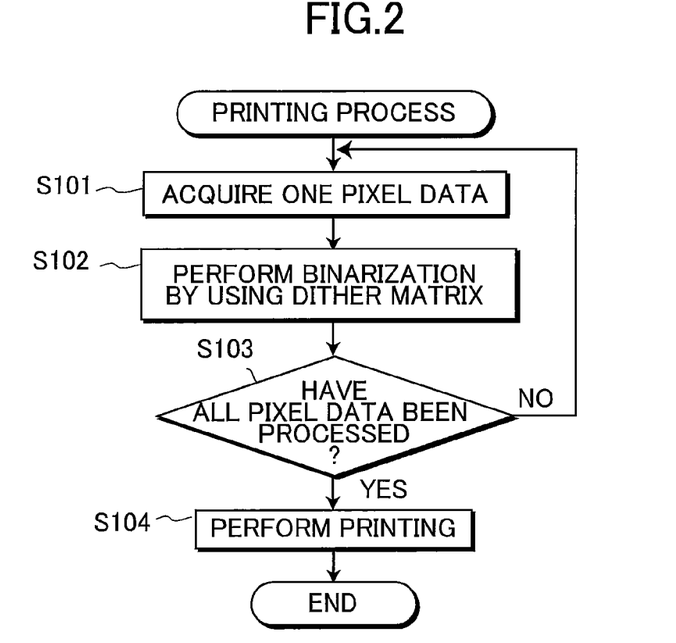
FIG. 2 is a flowchart illustrating steps in a printing process executed by the image processing apparatus according to the embodiment.

The controller 21 performs overall control of each component in the printer 2. The controller 21 includes a CPU 211, a ROM 212, and a RAM 213. The ROM 212 stores a program for controlling the CPU 211 to perform a printing process described below (FIG. 2).

The storage unit 22 is a nonvolatile storage device for storing data that can be overwritten. In this embodiment, flash memory is employed as the storage unit 22. A dither matrix 221 to be used for converting image data to binary data are stored in the storage unit 22 and will be described later in greater detail.

The communication unit 23 is an interface for performing data communications with the PC 1. The operating unit 24 is an input device that allows the user to input instructions through external operations. The operating unit 24 includes various operating buttons and keys.

The display unit 25 is an output device and includes a small liquid crystal display for displaying various data as images that convey information to the user. The image-forming unit 26 functions to form monochrome images by fixing toner to paper. More specifically, the image-forming unit 26 irradiates a laser beam onto the uniformly charged surface of a photosensitive drum based on binary image data in order to form an electrostatic latent image of the binary image. Next, the image-forming unit 26 deposits toner on the electrostatic latent image to form a toner image. The image forming unit 26 transfers this toner image onto a sheet of paper, and further fixes the toner image to the paper by heat in a fixing unit to complete the image-forming (printing) process.

Next, an overview of the processes executed on the printing system of the embodiment will be described. When the user of the PC 1 performs an operation in the application program 122 (where the application program 122 is a graphics tool or the like) to initiate a printing operation, the PC 1 performs a process as the printer driver 123 to transmit a print job to the printer 2 in the form of a print command. Here, the print command includes print data representing the image to be printed. In this embodiment, the print data is image data expressed in 64 tones.

Upon receiving a print job from the PC 1, the printer 2 performs a thresholding process (binarization) using the dither matrix 221 for converting the image rendered by the print data in the print job into binary values and forms a binary image in toner on paper based on the binary data produced from the thresholding process.

Here, the printing process executed by the control unit 21 of the printer 2 (and more specifically the CPU 211 of the control unit 21) when the printer 2 receives a print job will be described with reference to the flowchart in FIG. 2. In S101 at the beginning of the printing process, the control unit 21 acquires one pixel worth of unprocessed image data from the print data. The print data is configured of pixel data for individual pixels constituting the image to be printed.

In S102 the control unit 21 performs binarization process (a thresholding process) on the image data acquired in S101 using the dither matrix 221 stored in the storage unit 22. In other words, the control unit 21 converts the image data of the print data into binary data by using the dither matrix 221. In S103 the control unit 21 determines whether the thresholding process has been completed for all pixel data constituting the image represented by the print data.

The control unit 21 returns to S101 when determining in S103 that the binarization process has not been completed for all pixel data (i.e., that there remains unprocessed pixel data). However, when the control unit 21 determines in S103 that the binarization process has been performed for all pixel data, in S104 the control unit 21 executes a printing process for controlling the image-forming unit 26 to print the binary image converted and generated through the binarization process. Subsequently, the control unit 21 ends the printing process.

Next, the dither matrix 221 used by the printer 2 according to the embodiment will be described with reference to FIGS. 3 and 4A. The dither matrix 221 is an 8×8 cell matrix configured of four 4×4 cell sub-matrices. In other words, the dither matrix 221 has a plurality of sub-matrices (four sub-matrices in this embodiment) and each sub-matrix has a group of dot regions (16 dot regions in this embodiment) each dot region having a threshold value. In this embodiment, a dot region is tuned on when a threshold value of the dot region is smaller than the input value. Threshold values are set in the dither matrix 221 to meet the following conditions (1)-(5).

Figure 3:
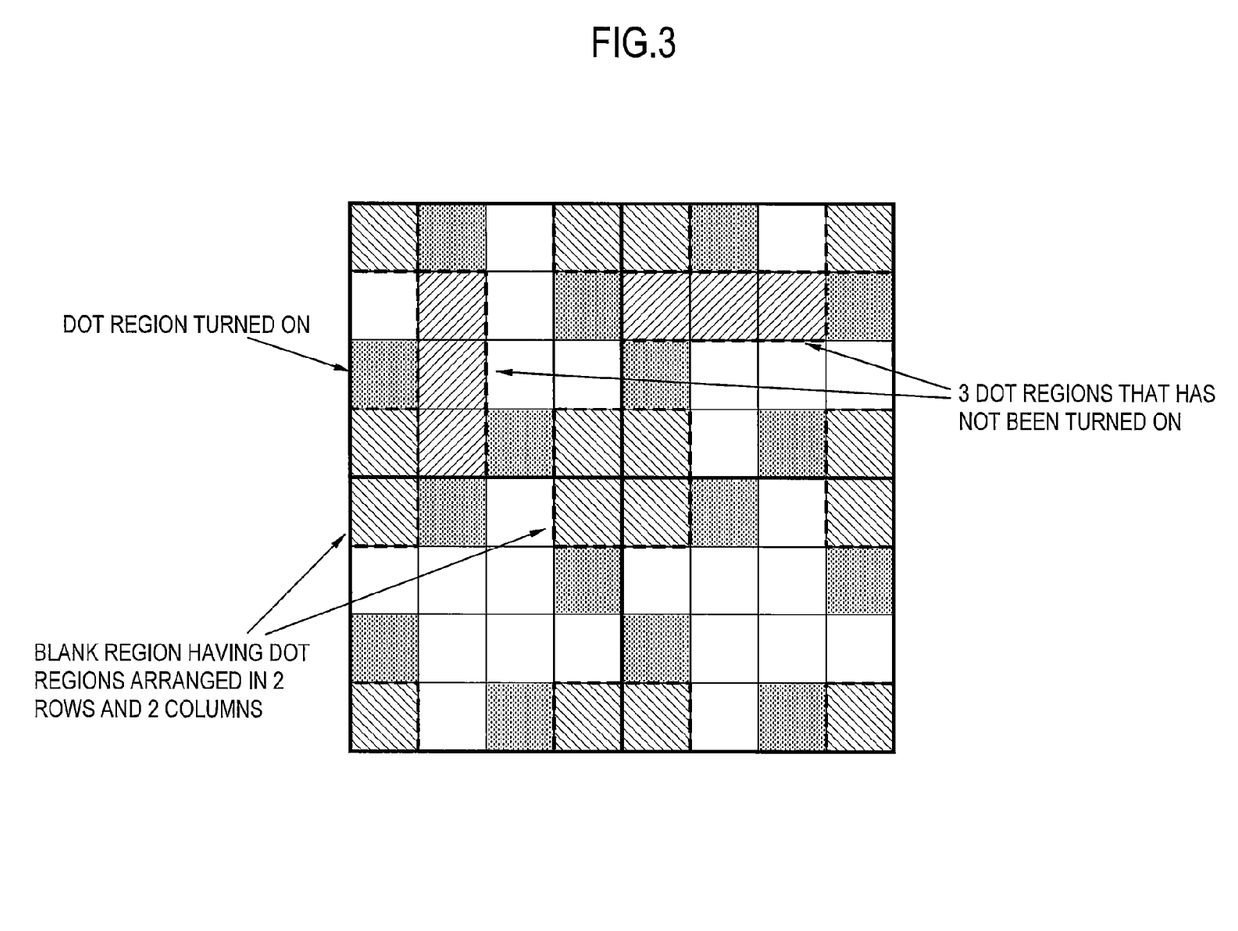
FIG. 3 is a conceptual diagram showing features of a dither matrix stored in the image processing apparatus according to the embodiment.

(1) Threshold values are set in the dither matrix 221 so that dots are not formed for multiple cells arranged in a row of each sub-matrix in any of the horizontal, vertical, and diagonal (45 and 135 degrees) directions when dots are on for four cells in the sub-matrix (the state shown in FIG. 3). In other words, as dots grow while an input value increases, a dot is arranged in only one cell of each of the horizontal and vertical directions of each sub-matrix at the earliest possible stage. Moreover, threshold values are distributed so that dots are not produced in multiple cells of diagonal lines at the same stage (i.e., only one or no dots are arranged in each diagonal line).

Figure 4A:
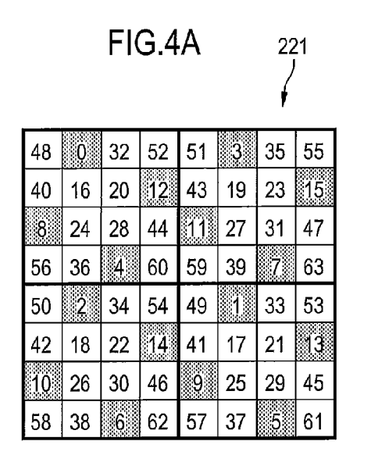
FIG. 4A is an explanatory diagram showing an example of dither matrix according to the embodiment and a dot formation formed by using the dither matrix according to the embodiment when an input value is 16.

Further, in other words, 16 dot regions are arranged in 4 rows and 4 columns in each sub-matrix and define a first diagonal line of the sub-matrix (for example, a line having dot regions assigned with "56", "24", "20" and "52" in FIG. 4A), a second diagonal line of the sub-matrix (for example, a line having dot regions assigned with "48", "16", "28" and "60" in FIG. 4A), a plurality of first orthogonal lines (for example, a line having dot regions assigned with "8", "16" and "32" in FIG. 4A) extending in a direction parallel to the first diagonal line, and a plurality of second orthogonal lines (for example, a line having dot regions assigned with "0", "20" and "44" in FIG. 4A) extending in a direction parallel to the second diagonal line. Four dot regions whose threshold value is smaller than a prescribed value ("16" in this embodiment) are contained in the group of dot regions of the sub-matrix. Only one of four dot regions is contained in each row and each column. At most one of four dot regions is contained in each first orthogonal line and each second orthogonal line.

(2) Threshold values are set in the dither matrix 221 so that any 2×2 cell unit-matrix produced when dividing a sub-matrix by four does not contain dots for multiple cells at the stage of growth in which dots are formed for four cells in each sub matrix (the state shown in FIG. 3). In this example, a dot is set to ON for one cell in each of the unit-matrices. In other words, when dots are arranged for only one cell in each row and column of a sub-matrix, the dots are evenly distributed with only one cell in every unit-matrix. In other words, each sub-matrix includes a plurality of unit-matrices each having a cluster of dot regions arranged in 2 rows and 2 columns so that only one of four dot regions is contained in each cluster of dot regions (unit-matrix).

(3) Threshold values are set in the dither matrix 221 so that the ON dots are all separated by a blank region corresponding to three cells (dot regions) in each row and column when dots are on for four cells in each sub-matrix (the state shown in FIG. 3). In other words, when dots have been set to ON for four cells in each sub-matrix, all dots in the dither matrix 221 are distributed at even intervals both horizontally and vertically.

In other words, threshold values are set so that, when the plurality of sub-matrices includes a first sub-matrix, a second sub-matrix adjacent to the first sub matrix in which N columns of the second sub-matrix are aligned with the N columns of the first sub-matrix, and a third sub-matrix adjacent to the first sub-matrix in which N rows of the third sub-matrix are aligned with the N rows of the first sub-matrix, a distribution of N dot regions in the second sub-matrix is identical to an distribution of N dot regions in the first sub-matrix and a distribution of N dot regions in the third sub matrix is identical to the distribution of N dot regions in the first sub-matrix. Further, threshold values are set so that, when the first sub-matrix has a first dot region having a threshold value smaller than the prescribed value and positioned in R-th row and C-th column in which each of R and C is an integer from 1 to 4, the second sub-matrix has a second dot region having a threshold value smaller than the prescribed value and positioned in C-th column, and the third sub-matrix has a third dot region having a threshold value smaller than the prescribed value positioned in R-th row. Three dot regions are disposed between the first dot region and the second dot region in C-th column, and between the first dot region and the second dot region in R-th row.

(4) Threshold values are set in each sub-matrix such that, after dots have been turned on for four cells in the sub-matrix, subsequent dots are produced at positions adjacent horizontally or vertically to a dot that is already on. In other words, after first turning dots on for four cells in a sub-matrix, the dots tend to form in a cluster, with each dot adjacent to another either horizontally or vertically. In other words, the threshold values are set in each sub-matrix such that, while the input value increases after N dot regions have been turned on in all sub-matrices, a dot region meeting the following conditions (a) and (b) is turned on in sequence: (a) the dot region is adjacent to a turned-on-dot region that has been already turned on; and (b) the dot region is positioned in one of row and column in which the turned-on-dot region is positioned.

(5) Threshold values are set in the dither matrix 221 such that, among the stages of dot growth that accompany an increase in the input value, there exists a growth stage in which all regions having no ON dots are 2×2 cells in size. In other words, during the stages of dot growth, dots are turned on in a sequence that preserves the 2×2 cell blank regions shown in FIG. 3 until the latest stage possible. In other words, the dither matrix includes at least one set of dot regions arranged in 2 rows and 2 columns, the at least one set of dot regions having threshold values greater than threshold values of dot regions adjacent to and surrounding the at least one set of dot regions. Particularly, each of four dot regions of the sub-matrix positioned in first row and first column, in first row and fourth column, in fourth row and first columns, and in fourth row and fourth column whose threshold value is greater than a predetermined value ("47" in this embodiment).

Figure 4B:
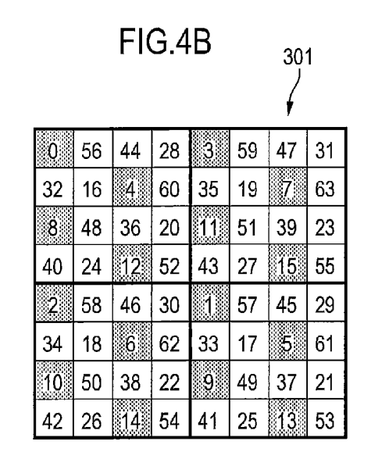
FIGS. 4B, 4C, and 4D are explanatory diagrams showing other dither matrices and dot formations formed by using the other dither matrices when an input value is 16.
Figure 4C:
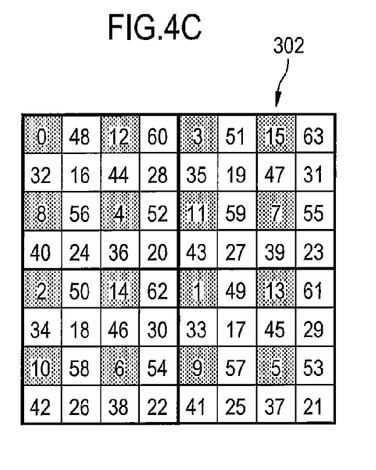
Figure 4D:
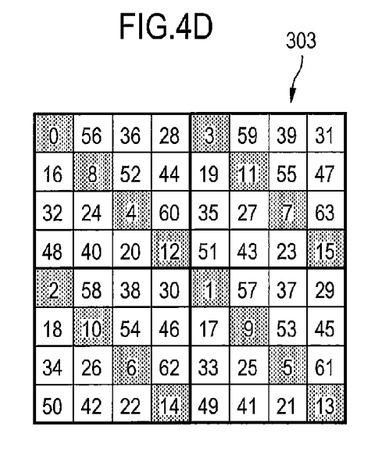

Next, the features of the growth patterns in the dither matrix 221 of the embodiment will be compared to those of conventional dither matrices. First, growth patterns of the dither matrices (changes of dot formations formed by the dither matrices) will be compared with reference to FIGS. 4A-4D at the one-quarter growth stage in which dots are turned on for sixteen cells (four cells in each sub-matrix). FIG. 4A shows the dither matrix 221 according to the embodiment of the present invention. FIGS. 4B-4D show dither matrices 301-303 serving as comparative examples 1-3. As with the dither matrix 221, each of the dither matrices 301303 is an 8×8 cell matrix formed of four 4×4 cell sub-matrices. The growth patterns at the time of one-quarter growth denote the state of dots when the input value (input density) is "16."

As shown in FIG. 4A, when the dither matrix 221 of the embodiment reaches one-quarter growth, a dot (dot region turned to ON) is arranged for exactly one cell in each row and column of each sub-matrix. At the same time, multiple dot regions are not arranged along any diagonal direction in a sub-matrix, and a dot is arranged for exactly one cell in each 2×2 unit-matrix. Additionally, all dot regions set to ON in the dither matrix 221 are separated by three cells worth of blank space in the horizontal and vertical directions. Hence, the dither matrix 221 of the embodiment meets conditions (1)-(3) and (5) described above.

In contrast, when the dither matrix 301 of comparative example 1 is at one-quarter growth, as shown in FIG. 4B, each sub-matrix includes columns with no dots and columns with dots arranged for two cells. The dither matrix 301 also has no growth stage in which there are three cells worth of blank space formed between all dots set to ON in the horizontal and vertical directions. Further, the dither matrix 301 has already lost all 2×2 cell blank regions at the stage shown in FIG. 4B. Hence, the dither matrix 301 does not satisfy conditions (1), (3), and (5) described above.

When the dither matrix 302 of comparative example 2 is at one-quarter growth, as shown in FIG. 4C, each sub-matrix includes both rows and columns with no dots and rows and columns in which dots are formed for two cells. Dots are also arranged for two cells along diagonal lines. The dither matrix 302 also has no growth stage at which three cells worth of blank spaces are arranged between all dots set to ON in the horizontal and vertical directions. The dither matrix 302 also has already lost all 2×2 cell blank regions at this stage. Hence, the dither matrix 302 of comparative example 2 does not satisfy conditions (1), (3), and (5) described above.

When the dither matrix 303 of comparative example 3 is at one-quarter growth, as shown in FIG. 4D, each sub-matrix has a line of dots formed for four cells along a diagonal direction and includes unit-matrices with dots arranged for two cells. Hence, the dither matrix 303 of comparative example 3 does not satisfy conditions (1) and (2) described above.

In this way, the dither matrix 221 of the embodiment at one-quarter growth arranges a dot in one cell for each row and column, thereby reducing the occurrence of disappearing fine lines at low-level values (for example, an input value of "16" as shown in FIG. 4A) either horizontally or vertically. Moreover, the dither matrix 221 does not disproportionately arrange two or more dots along any diagonal line, thereby reducing the possibility to one-in-four that fine lines at low-level values extending in a diagonal direction will disappear.

In contrast, the dither matrix 301 of comparative example 1 may cause vertical fine lines with low-level values to disappear because some of the columns have no dots arranged therein. Similarly, the dither matrix 302 of comparative example 2 may eliminate both horizontal and vertical fine lines with low-level values since there exist some columns and rows with no dots arranged therein. On the other hand, the dither matrix 303 of comparative example 3, like the dither matrix 221 of the embodiment, is unlikely to make fine lines of low-level values disappear either horizontally or vertically since a dot is arranged for one cell in every row and column of each sub-matrix. However, with the dither matrix 303, there is a three-in-four possibility that fine lines of low-level values will disappear when following the same diagonal direction as the line of dots (135 degrees).

Next, the growth patterns of the same dither matrices 221 and 301-303 will be compared with reference to FIGS. 5A-5D for a stage of growth (one-half growth) at which dots have been turned on for thirty-two cells in the dither matrix (eight cells for each sub-matrix). The growth pattern at one-half growth shows the state of dots when the input value is "32".

Figure 5A:
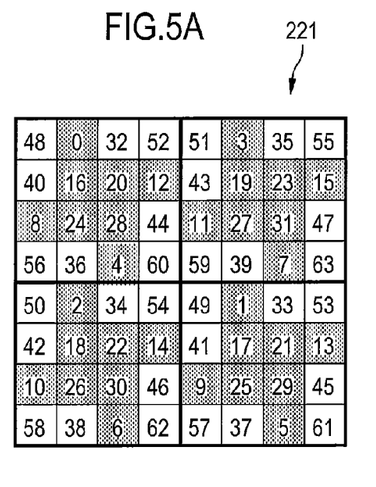
FIG. 5A is an explanatory diagram showing a dot formation formed by using the dither matrix shown in FIG. 4A when the input value is 32.

During the process of growth from the one-quarter growth state shown in FIG. 4A to the one-half growth state shown in FIG. 5A, the dither matrix 221 of the embodiment is configured to turn on dots at positions horizontally or vertically adjacent to discrete dots that are already on, thereby forming a single dot cluster in which each dot is adjacent to another in at least one of the horizontal and vertical directions. In other words, the dither matrix 221 of the embodiment satisfies condition (4) described above. At this growth state, the dither matrix 221 still has 2×2 cell blank regions.

Figure 5B:
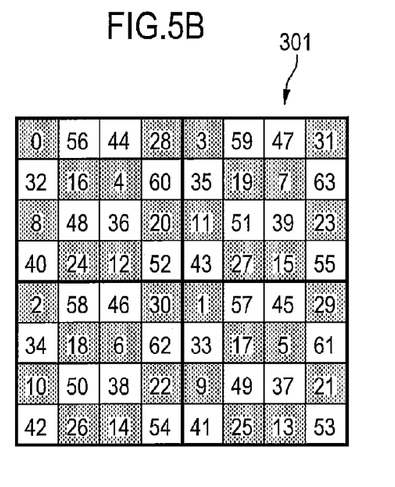
FIGS. 5B, 5C, and 5D are explanatory diagrams showing dot formations formed by using the other dither matrices shown in FIGS. 4B, 4C, and 4D when the input value is 32, respectively.

The dither matrix 301 of comparative example 1 shown in FIG. 5B also turns on dots at positions horizontally or vertically adjacent to dots that are already on. However, the dots that are turned on do not form a single dot cluster in which each dot is adjacent to another in at least one of the horizontal and vertical directions.

Figure 5C:
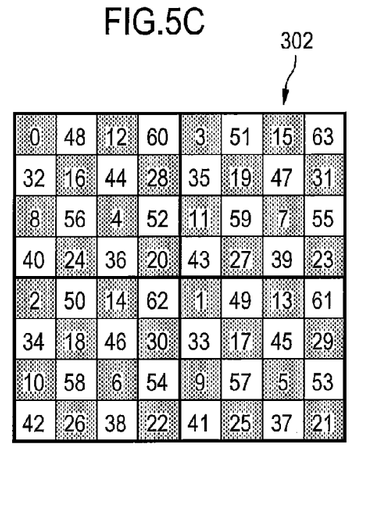

During the process of dot growth from the one-quarter growth state shown in FIG. 4C to the one-half growth state shown in FIG. 5C, the dither matrix 302 of comparative example 2 turns on dots at positions not neighboring either horizontally or vertically dots that are already on. Hence, the dither matrix 302 does not satisfy condition (4).

Figure 5D:
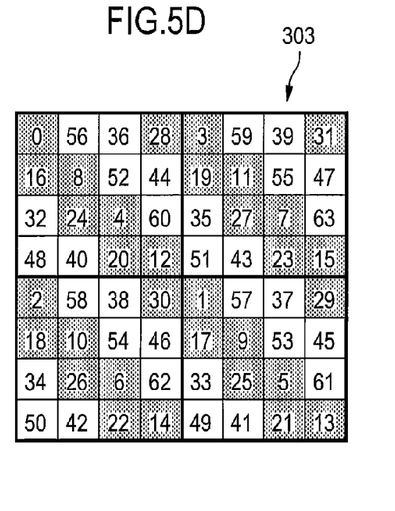

As shown in FIG. 5D, the dither matrix 303 of comparative example 3 does not include a 2×2 cell blank region at the stage of one-half growth. Hence, the dither matrix 303 does not satisfy condition (5) described above.

As described above, since the dither matrix 221 of the embodiment maintains 2×2 cell blank regions, even at one-half growth, the dither matrix 221 can prevent the collapse (filling in) of such blank regions due to dot gain, toner scattering, or the like.

In contrast, blank regions in the dither matrix 301 will have a greater tendency to collapse because they are only one cell worth wide in the vertical direction. Similarly, blank regions in the dither matrices 302 and 303 may easily collapse because they are only one cell wide in both horizontal and vertical directions in the dither matrix 302 and only one cell wide diagonally in the dither matrix 303.

Next, the growth patterns of the same dither matrices will be compared with reference to FIGS. 6A-6D for the growth stage (three-quarters growth) at which dots have been turned on for forty-eight cells in the dither matrix (twelve cells in each sub matrix). A growth pattern at three-quarters growth indicates the state of dots when the input value is "48".

Figure 6A:
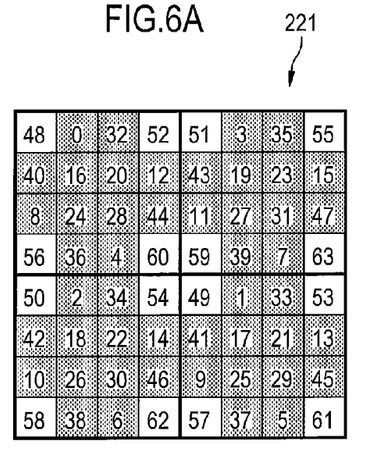
FIG. 6A is an explanatory diagram showing a dot formation formed by using the dither matrix shown in FIG. 4A when the input value is 48.

During the process of growth from the one-half growth state shown in FIG. 5A to the three-quarters growth state shown in FIG. 6A, the dither matrix 221 according to the embodiment is configured to turn on dots at positions horizontally or vertically adjacent to dots that are already on in order to form a single dot cluster in which each dot is adjacent to another dot in at least one of the horizontal and vertical directions. Further, all blank regions formed with the dither matrix 221 are exactly 2×2 cells in size. While the blank regions on the edges of the dither matrix 221 do not appear to be 2×2 cells in size, the edges form 2×2 cell blank regions when multiple dither matrices 221 are juxtaposed horizontally or vertically. Hence, the dither matrix 221 of the embodiment satisfies conditions (4) and (5) described above.

Figure 6B:
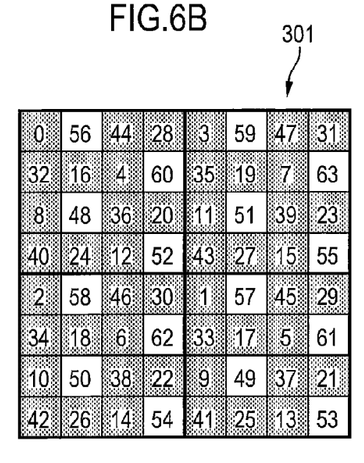
FIGS. 6B, 6C, and 6D are explanatory diagrams showing dot formations formed by using the other dither matrices shown in FIGS. 4B, 4C, and 4D when the input value is 48, respectively.
Figure 6C:
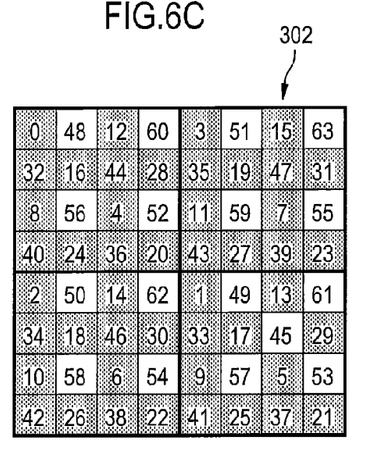
Figure 6D:
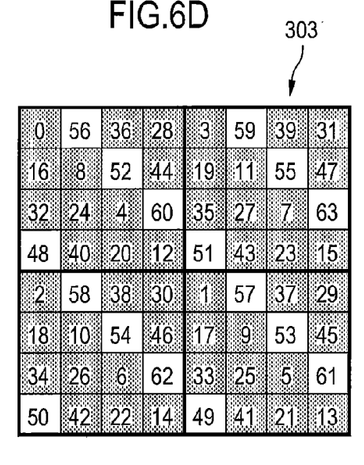

In contrast, the blank cells in the dither matrices 301-303 shown in FIGS. 6B-6D are not adjacent to other blank cells in the horizontal and vertical directions, but rather are all isolated. Thus, by maintaining 2×2 cell blank regions even at the three-quarters growth stage, the dither matrix 221 of the embodiment can prevent such blank regions from collapsing due to dot gain, toner scattering, or the like. The blank regions in the dither matrices 301-303, on the other hand, tend to collapse since they are all in the form of single, isolated cells.

Figure 7A:
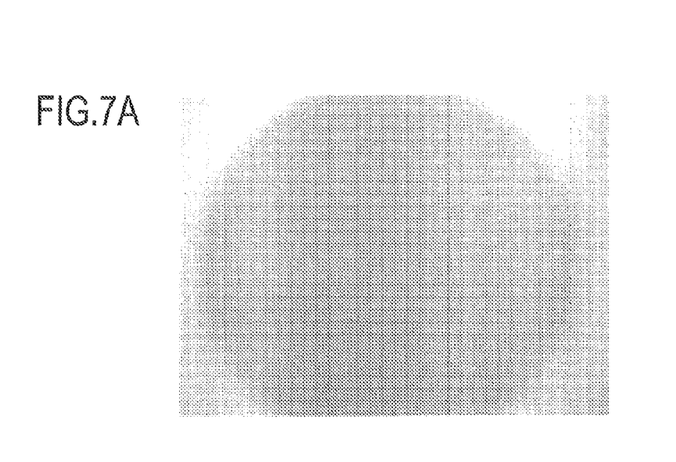
FIGS. 7A, 7B, and 7C are enlarged images that includes fine vertical lines having low density and are formed by using the dither matrix shown in FIGS. 4A, 4B, and 4C, respectively.
Figure 7B:
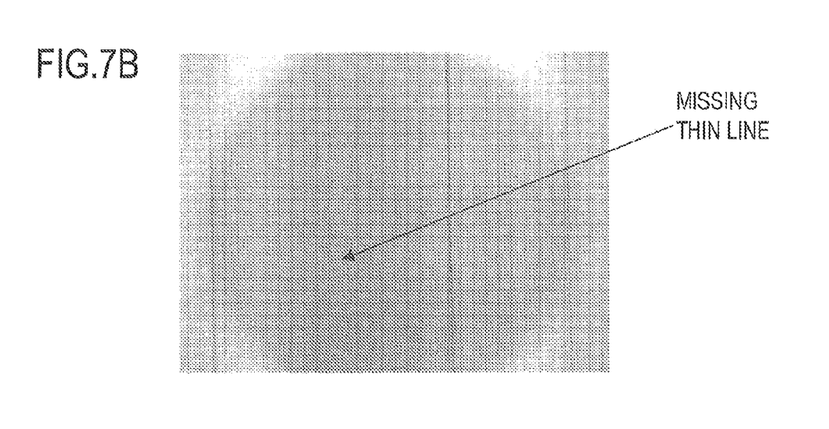
Figure 7C:
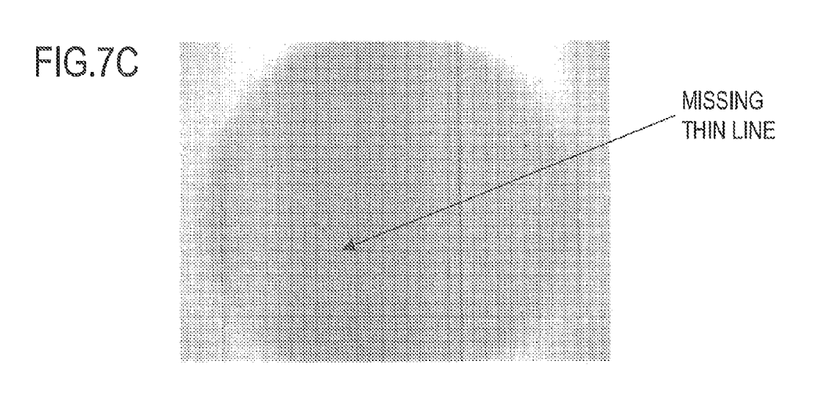

FIGS. 7A-7C are enlarged photos of printed images having fine vertical lines at low-level values. The image in FIG. 7A was formed using the dither matrix 221 of the embodiment. The image in FIG. 7B was formed using the dither matrix 301 of comparative example 1. The image in FIG. 7C was formed using the dither matrix 302 of comparative example 2. As can be seen in the photos, all fine lines were printed in the image formed using the dither matrix 221 of the embodiment, but one thin line was lost in images formed using the dither matrices 301 and 302, because the dither matrices 301 and 302 include columns that do not have any dots arranged therein for a low-level value (one-quarter growth stage, for example). Consequently, printing using these conventional dither matrices may result in the loss of such characters as "i" and "T". Horizontal fine lines may also be lost when using the dither matrix 302 of comparative example 2, because the dither matrix 302 includes rows that have no dots formed therein at a stage of low-level values.

Figure 8A:
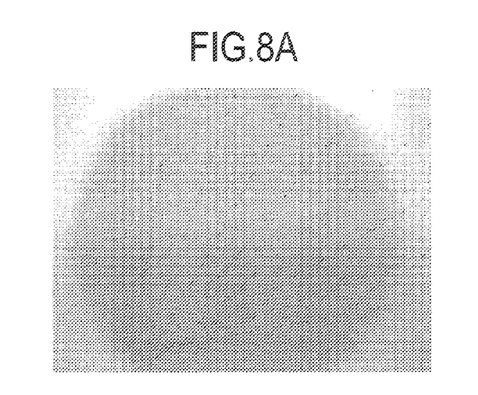
FIGS. 8A, 8B, 8C, and 8D are enlarged images that include fine lines formed at low density and arranged in a plurality of angles and are formed by using the dither matrix shown in FIGS. 4A, 4B, 4C, and 4D, respectively.
Figure 8B:
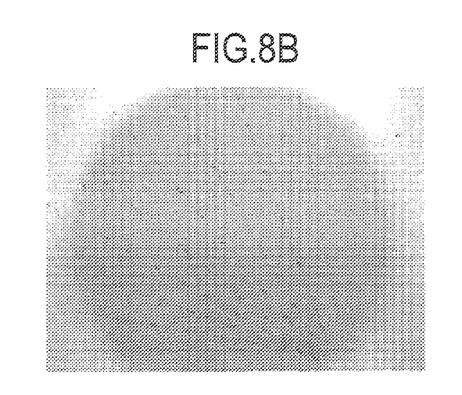
Figure 8C:
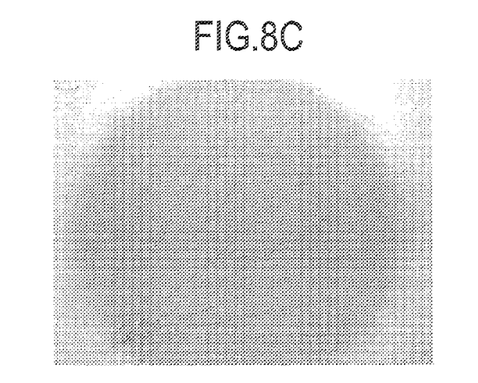
Figure 8D:
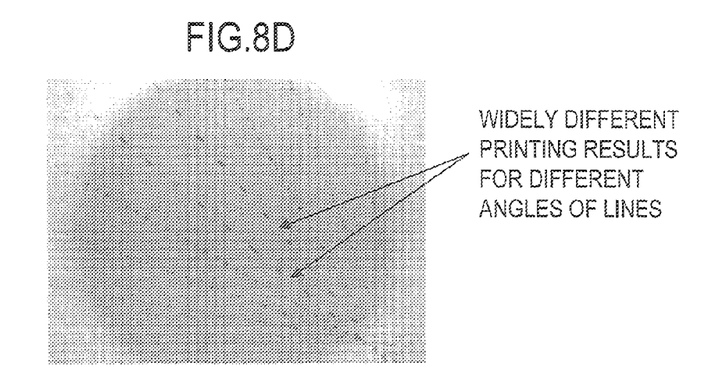

FIGS. 8A-8D are enlarged photos of printed image that include fine lines formed at low-level values and arranged in a plurality of angles. FIGS. 8A and 8B show images formed using the dither matrix 221 of the embodiment, while FIGS. 8C and 8D show images formed using the dither matrix 303 of comparative example 3. The angles of the fine lines shown in FIGS. 8A and 8B as well as the angles shown in FIGS. 8C and 8D have left-to-right symmetry. As shown in FIG. 8A, the dither matrix 221 of the embodiment yields the same printing results, whether the fine lines are angled left or right. However, the dither matrix 303 yields widely different printing results for different angles of fine lines, with the degree of loss in the lines depending on their angle.

Figure 9A:
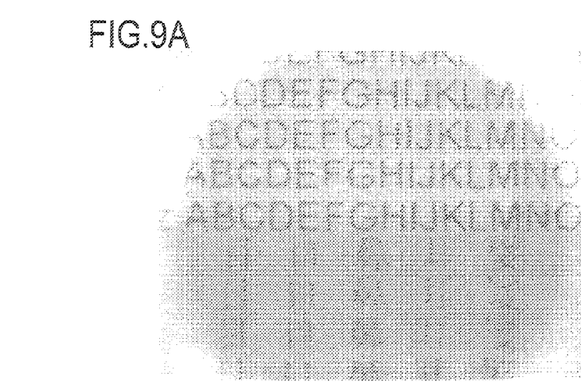
FIGS. 9A, 9B, 9C, and 9D are enlarged images that include characters having small font and low density and are formed by using the dither matrix shown in FIGS. 4A, 4B, 4C, and 4D, respectively.
Figure 9B:
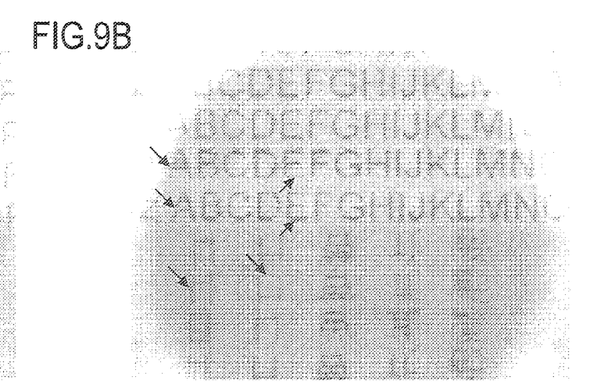
Figure 9C:
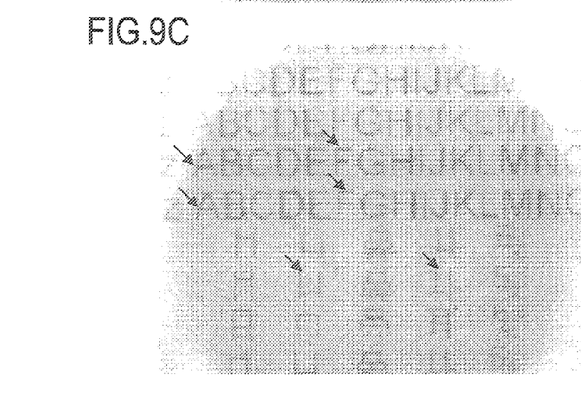
Figure 9D:
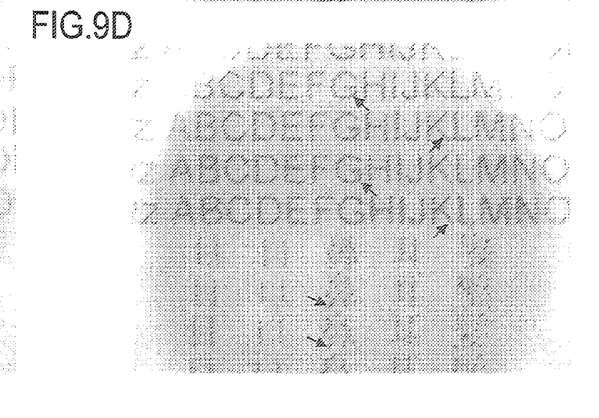

FIGS. 9A-9D are enlarged photos of printed images with alphabetic characters (A, B, C, . . . ) and Chinese characters (日, 口, 鼻, 髟, 丩) formed in a small font (4 pt, for example) and at low-level values. FIG. 9A is an image formed using the dither matrix 221 of the embodiment. FIG. 9B is an image formed using the dither matrix 301. FIG. 9C is an image formed using the dither matrix 302. FIG. 9D is an image formed using the dither matrix 303. As can be seen in FIGS. 9A-9D, the dither matrix 221 according to the embodiment reproduces the characters uniformly, regardless of the type of text or printed position. In contrast, lines constituting characters formed using the dither matrices 301 and 302 are irregular, sometimes bolder and sometimes disappearing entirely. Characters formed using the dither matrix 303 also differ in appearance, with the shape of lines constituting the characters varying according to the printed position.

Figure 10:
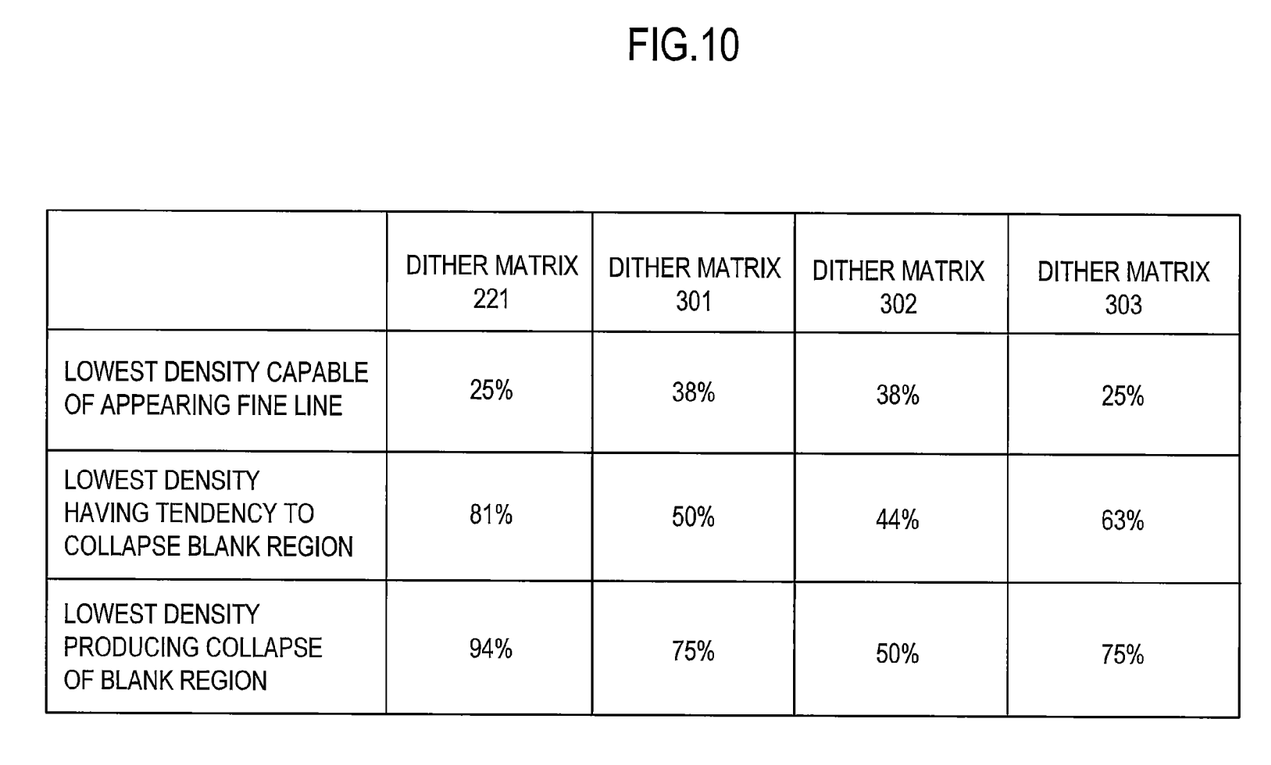
FIG. 10 is a table showing differences in input densities between the dither matrix according to the embodiment and the other dither matrices shown in FIGS. 4B, 4C, and 4D.

In the printing system of the embodiment described above, the dither matrix 221 used by the printer 2 in the binarization process is configured to produce a dot for one cell in each row and column of each sub-matrix at the earliest possible stage (the stage at which one-fourth of all dots in the dither matrix 221 are turned on). Therefore, as shown in the table of FIG. 10, the dither matrix 221 according to the embodiment prevents fine lines from disappearing in both horizontal and vertical directions, provided that the input density is at least 25%. When using the dither matrices 301 and 302 of comparative examples 1 and 2, on the other hand, fine lines in either horizontal or vertical directions can disappear until the input density rises to about 38% or greater.

The dither matrix 303 of comparative example 3, like the dither matrix 221 of the embodiment, can prevent fine lines from disappearing in both horizontal and vertical directions, provided that the input density is at least 25%. However, since dots for four cells are arranged in a diagonal line in each sub-matrix, three in four fine lines extending diagonally along the same direction as the line of dots (135 degrees) disappear. However, the dither matrix 221 of the embodiment suppresses the rate at which diagonal fine lines disappear to one-in-four, since dots are not arranged for multiple cells in a diagonal line.

Hence, the dither matrix 221 of the embodiment is capable of reducing the likelihood of such conventional problems as (1) fine lines at low-level values disappearing in the thresholding process, and (2) some of the lines constituting small characters at low-level values being lost in the thresholding process, making text difficult to read.

A particular feature of the invention is that the dither matrix 221 distributes dots so that multiple dots are not disproportionally arranged in any unit-matrix. Accordingly, the dither matrix 221 further suppresses a bias in dots produced at low-level values, particularly improving the reproducibility of small characters at low-level values.

Moreover, the dither matrix 221 distributes all dots at equal intervals horizontally and vertically, thereby reproducing smoother edges for fine lines and characters rendered at low-level values in the thresholding process.

At the same time, after turning on dots for four cells in each sub matrix, the dither matrix 221 of the embodiment forms a dot cluster in which each dot is adjacent to another dot either horizontally or vertically. Consequently, the printer 2 of the printing system can form (print) dots in toner with stability.

In addition, since the dither matrix 221 maintains 2×2 cell blank regions at each stage of dot growth accompanying an increase in the input value, these blank regions are less likely to become filled (the blank regions collapse) due to dot gain, toner scattering, or the like. Specifically, as shown in the table of FIG. 10, the dither matrix 221 of the embodiment maintains 2×2 cell blank regions for input densities up to approximately 81%, and these blank regions are not isolated as single cells until the input density finally exceeds approximately 94%. In contrast, the dither matrices 301-303 lose all 2×2 cell blank regions and produce only single-cell, isolated blank regions at an earlier stage. Accordingly, the dither matrix 221 of the embodiment can prevent the collapse of blank regions in areas of an image having high input densities and, thus, is capable of producing high-resolution printed images.

While the invention has been described in detail with reference to specific embodiments thereof, it would be apparent to those skilled in the art that many modifications and variations may be made therein without departing from the spirit of the invention, the scope of which is defined by the attached claims.

For example, the printer 2 may employ different dither matrices in the binarization process based on the content of the image expressed by the print data. Specifically, when the image is configured of objects, the printer 2 can analyze the content of the objects to determine whether the image includes fine lines or text at low level values. The printer 2 may perform thresholding using the dither matrix 221 of the above-described embodiment when the image includes fine lines and text at low-level values and may perform thresholding using a conventional dither matrix when the image does not include such fine lines and text.

In the above-described embodiment, the printer 2 converts images expressed in 64-tone print data into binary values, but the number of tone levels in the print data may be 256 levels, for example, and is not limited to 64 tones.

Further, the dither matrix 221 of the above-described embodiment is an 8×8 cell matrix configured of four juxtaposed 4×4 cell sub-matrices, but the sizes of the dither matrix and its sub-matrices may be modified. The sub-matrix may be configured of a group of dot regions arranged in N rows and N columns where N is an integer greater than or equal to 4.

The growth pattern of the dither matrix is also not limited to the example in the preferred embodiment. For example, the dither matrix may produce a four-cell blank region in the center of each 4×4 cell sub-matrix at the three-quarters growth stage.

In the printing system of the above-described embodiment, the printer 2 functions as the image processor of the present invention, but the present invention is not limited to this configuration. For example, the processes in S101-S103 of the printing process shown in FIG. 2 may be implemented on the PC 1 as a process of the printer driver 123, for example. In this case, the PC 1 corresponds to the image processing apparatus of the present invention.

What is claimed is:

1. An image processing apparatus comprising:
   a storage unit that stores a dither matrix including a plurality of sub-matrices, each sub-matrix having a group of dot regions and each dot region having a threshold value, the dot regions being arranged in N rows and N columns in which N is an integer greater than or equal to 4 and the dot regions defining a first diagonal line and a second diagonal line, each sub-matrix having a plurality of first orthogonal lines extending in a direction parallel to the first diagonal line and a plurality of second orthogonal lines extending in a direction parallel to the second diagonal line, N dot regions whose threshold value is smaller than a prescribed value being contained in the group of dot regions, only one of N dot regions being contained in each row and each column, at most one of N dot regions being contained in each first orthogonal line and each second orthogonal line; and
   a converting unit that is configured to convert print data into binary data by using the dither matrix,
   wherein a dot region is turned on when a threshold value of the dot region is smaller than an input value,
   wherein the threshold values are set in each sub-matrix such that, while the input value increases after N dot regions have been turned on in all sub-matrices, a dot region meeting the following conditions (a) and (b) is turned on in sequence:
   (a) the dot region is adjacent to a turned-on-dot region that has been already turned on; and (b) the dot region is positioned in one of row and column in which the turned-on-dot region is positioned.

2. The image processing apparatus according to claim 1, wherein N is obtained by multiplying M by 2 in which M is an integer greater than or equal to 2, each sub-matrix including a plurality of unit-matrices each having a cluster of dot regions arranged in 2 rows and 2 columns, only one of N dot regions being contained in each cluster of dot regions.

3. The image processing apparatus according to claim 1, wherein the plurality of sub-matrices includes a first sub-matrix, a second sub-matrix adjacent to the first sub-matrix in which N columns of the second sub-matrix are aligned with the N columns of the first sub-matrix, and a third sub-matrix adjacent to the first sub-matrix in which N rows of the third sub-matrix are aligned with the N rows of the first sub-matrix,
  wherein a distribution of N dot regions in the second sub-matrix is identical to an distribution of N dot regions in the first sub-matrix,
  wherein a distribution of N dot regions in the third sub-matrix is identical to the distribution of N dot regions in the first sub-matrix.

4. The image processing apparatus according to claim 1, wherein N is 4,
  wherein the plurality of sub-matrices includes a first sub-matrix, a second sub-matrix adjacent to the first sub-matrix in which four columns of the second sub-matrix are aligned with four columns of the first sub-matrix, and a third sub-matrix adjacent to the first sub-matrix in which four rows of the third sub-matrix are aligned with four rows of the first sub-matrix,
  wherein the first sub-matrix has a first dot region whose threshold value is smaller than the prescribed value, the first dot region being positioned in R-th row and C-th column in which each of R and C is an integer from 1 to 4,
  wherein the second sub-matrix has a second dot region whose threshold value is smaller than the prescribed value, the second dot region being positioned in C-th column, three dot regions being disposed between the first dot region and the second dot region in C-th column,
  wherein the third sub-matrix has a third dot region whose threshold value is smaller than the prescribed value, the third dot region being positioned in R-th row, three dot regions being disposed between the first dot region and the second dot region in R-th row.

5. The image processing apparatus according to claim 1, wherein the dither matrix includes at least one set of dot regions arranged in 2 rows and 2 columns, the at least one set of dot regions having threshold values greater than threshold values of dot regions adjacent to and surrounding the at least one set of dot regions.

6. The image processing apparatus according to claim 1, wherein each of four dot regions positioned in first row and first column, in first row and Nth column, in Nth row and first columns, and in Nth row and Nth column whose threshold value is greater than a predetermined value.

\* \* \* \* \*